United States Patent

Nicholl

[15] 3,675,108
[45] July 4, 1972

[54] INDUCTION CHARGING DEVICE

[72] Inventor: Thomas H. Nicholl, 1204 W. 27th St., Kansas City, Mo. 64108

[22] Filed: Oct. 12, 1971

[21] Appl. No.: 187,982

[52] U.S. Cl. .................................................. 320/2
[51] Int. Cl. ................................................ H01m 45/04
[58] Field of Search ............................ 320/2–6, 59, 15, 320/18; 221/66

[56] References Cited

UNITED STATES PATENTS

| | | | |
|---|---|---|---|
| 2,832,177 | 4/1958 | Mueller | 320/2 UX |
| 3,171,568 | 3/1965 | Arwine | 320/4 X |
| 3,277,358 | 10/1966 | Nicholl | 320/2 X |
| 3,418,552 | 12/1968 | Holmes | 320/2 |

*Primary Examiner*—J. D. Miller
*Assistant Examiner*—Robert J. Hickey

[57] ABSTRACT

An induction charging device for recharging a battery or batteries for use in a rechargeable battery powered appliance is disclosed and includes a housing having walls defining a passage extending therethrough with the passage having an entrance shaped to receive a rechargeable battery powered appliance. An appliance support member is positioned within the passage to receive an appliance or battery container and move same along a battery recharging path having a transformer primary coil and core within the housing and arranged adjacent the battery recharging path so that a secondary coil and core within the appliance or battery container will move along the battery recharging path with the respective cores aligned. A current is connected to the primary coil to thereby energize the secondary coil in the appliance or battery container and direct current through a rectifier in the appliance whereby a unidirectional current is supplied to the rechargeable battery or batteries in the appliance. Cooperative portions on the passage defining walls and a body of the appliance or battery container in the battery recharging path and act as a key whereby only an appliance or battery container having a proper size ans shape may be received in and move in the respective cooperative interengaging portions and have the battery or batteries therein charged in the induction charging device.

11 Claims, 5 Drawing Figures

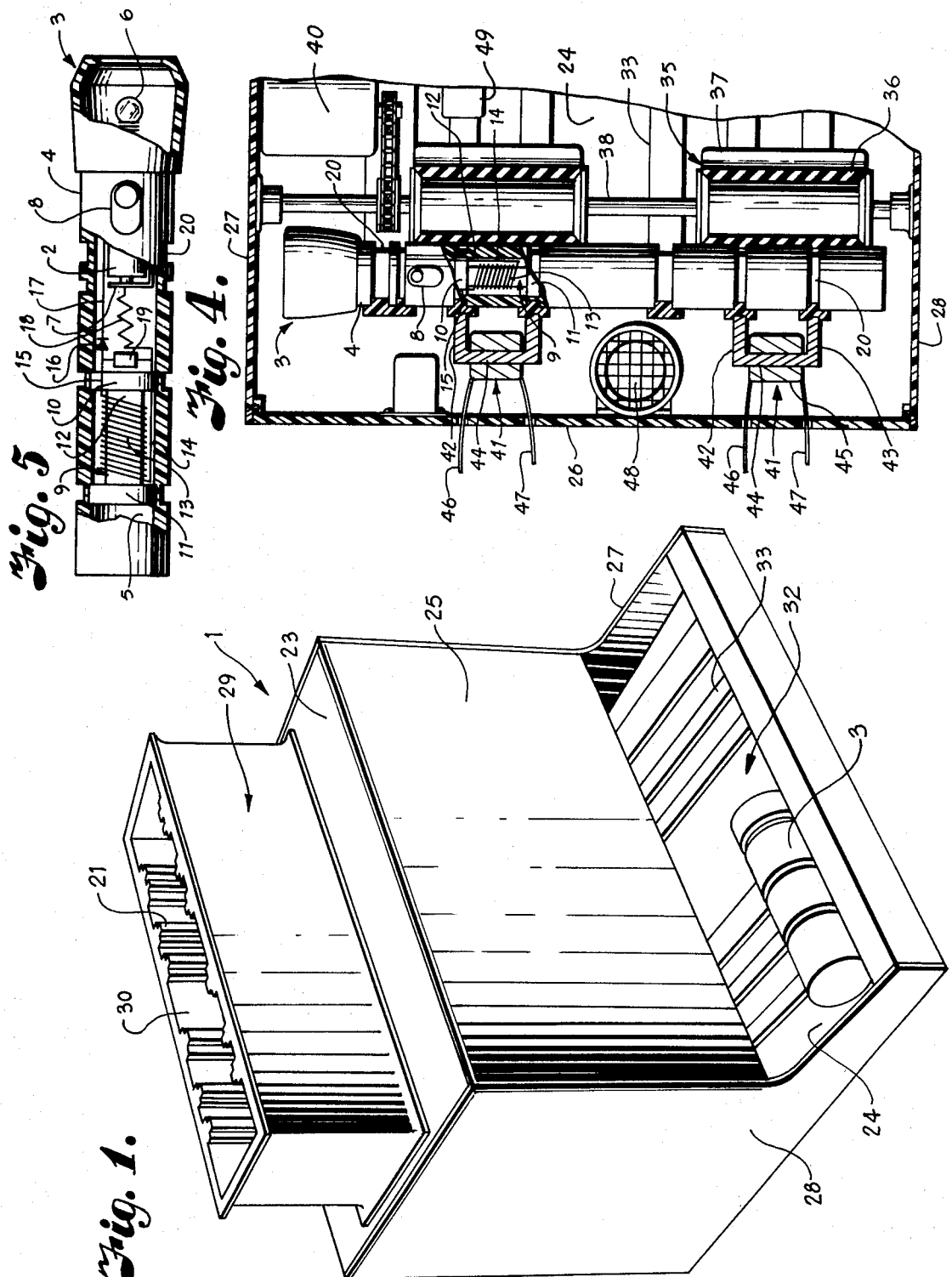

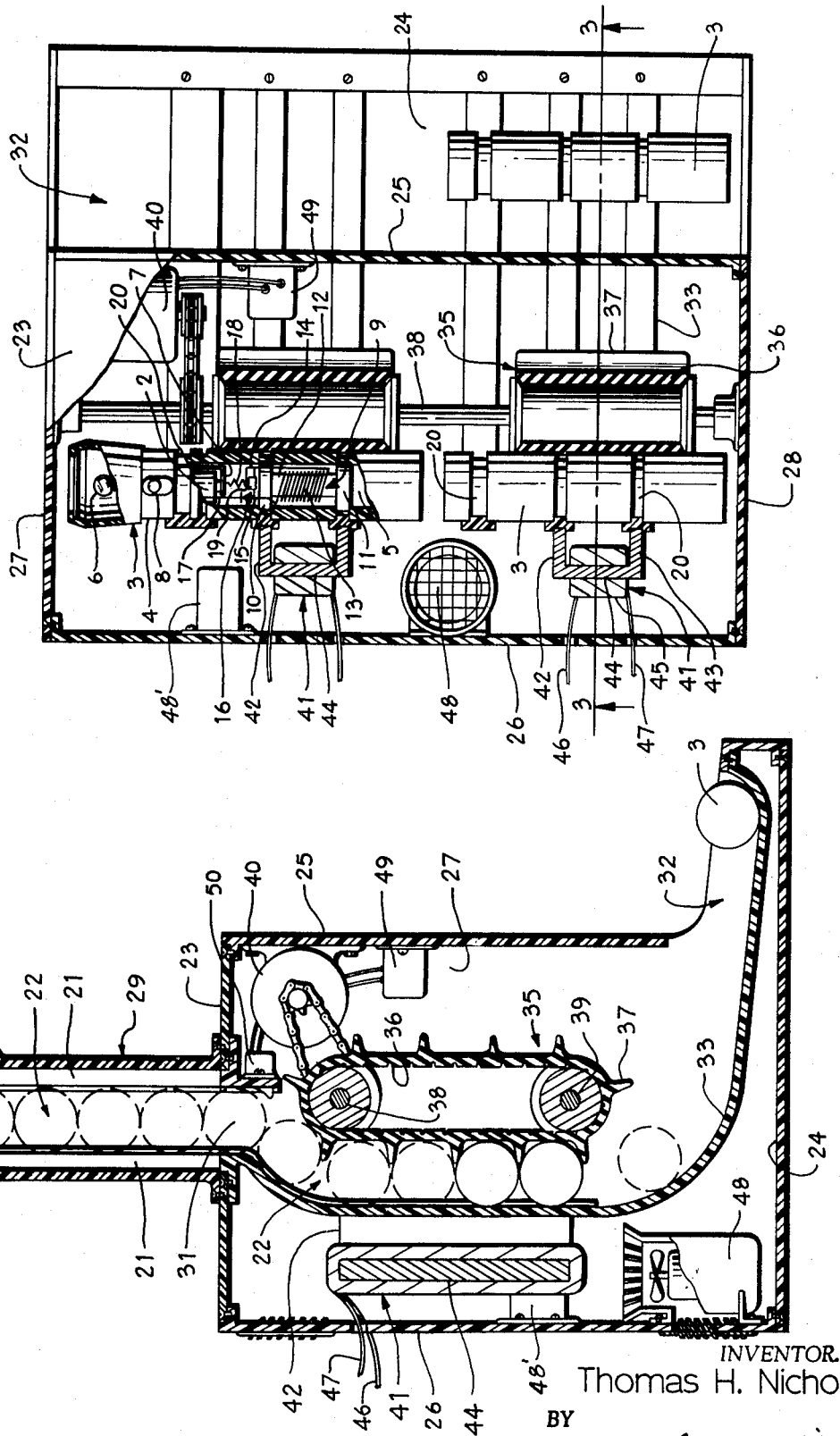

INDUCTION CHARGING DEVICE

The present invention relates to devices for charging batteries and more particularly to an induction charging device for charging the batteries of hand-held electrically powered appliances of the cordless type.

Many companies use a large volume of substantially identical cordless relatively high power consumption hand-held electrical appliances, such as flashlights, drills, and other battery powered tools. Pilferage of such tools and appliances results in a substantial loss to such companies. If the batteries of such devices were easily rechargeable, as with an ordinary charger, people stealing said devices and tools, would have the batteries thereof charged without difficulty.

The principal objects of the present invention are: to provide a battery charging arrangement for cordless electrical appliances having means therein for cooperating with means on the appliance to key the appliance and the recharging device whereby only selected appliances may be recharged therein; to provide such a battery recharging device having members on passage walls to cooperate with and engage members on appliance or battery container walls to code the passages and appliances so that only batteries in coded appliances or battery containers can be recharged in the recharging device thereby substantially eliminating pilferage; to provide such a battery recharging device wherein the coded appliances are not adapted to be recharged in any other recharging device and the proper electromagnetic alignment for battery recharging can be effected only in the battery recharging device of the present invention; to provide such a battery recharging device operative to provide a plurality of voltage systems wherein batteries in appliances can be recharged in mixed or interchangeable relation as determined by a coded relation between the respective appliances and passages through the device; to provide such a battery recharging device operative to automatically turn off when the batteries are properly recharged and when the passage is empty, as after the last appliance has moved therethrough; to provide such a recharging device particularly adapted for fast or quick charging the batteries of the appliance in one passage or portion and trickle or slow charging similar batteries for appliances in an other passage or portion; to provide such a battery charging device having an appliance support member therein adapted to receive and move the keyed appliances therethrough at a selected rate thereby controlling the recharging operation; to provide such a battery recharging device having a transformer primary coil and core therein positioned to energize a transformer secondary coil and core within each appliance or battery container thereby recharging the battery or batteries within the respective appliance or container moving through the battery charging device; to provide such a battery charging apparatus wherein the primary and secondary windings are in portions of the charger housing and the appliance housing respectively and having proximate location as the appliance or container moves along the charging path; and to provide such a battery recharging device which is economical to manufacture, positive in operation, accurately positions the appliance or battery container therein for establishing an electrical charging coupling, and which is particularly well adapted for the proposed use.

Other objects and advantages of this invention will become apparent from the following description taken in connection with the accompanying drawings wherein are set forth by way of illustration and example, certain embodiments of this invention.

FIG. 1 is a perspective view of an induction charging device embodying features of the present invention.

FIG. 2 is a plan view of the induction charging device with portions broken away to show the component parts and showing a rechargeable battery powered appliance and a container for rechargeable batteries each positioned in a battery recharging path through the charging device.

FIG. 3 is a transverse sectional view through the charging device taken on line 3—3, FIG. 2, and showing a passage and battery recharging path therethrough and means for moving appliances and battery containers through the recharging path with a plurality of positions of the appliances and battery containers shown in broken lines.

FIG. 4 is a fragmentary plan view of the induction charging device showing an elongated rechargeable battery powered appliance in the battery recharging path and with portions of the appliance broken away to show a transformer secondary coil and core therein.

FIG. 5 is an enlarged elevational view of an appliance with portions broken away to show the component parts.

Referring more in detail to the drawings:

As required, detailed embodiments of the invention are disclosed herein, however, it is to be understood that these embodiments are merely exemplary of the invention which may be embodied in many forms that are different from those illustrative embodiments presented herein. Therefore, specific structural and functional details disclosed herein are not to be interpreted as limiting but merely as a basis for the claims actually defining the scope of the invention. In this regard, it is to be recognized that battery recharging devices in accordance herewith may be embodied in various forms adapted to receive and move therethrough battery containers and appliances of various sizes and shapes and having various appliance or container supports and coding arrangements and furthermore that such structures may be variously energized or actuated, however, the disclosure hereof is presented only as representative basis for teaching one skilled in the art to variously employ the present invention in virtually any appropriate detailed structure.

The reference numeral 1 generally designates an induction charging device for recharging a battery or batteries 2 for use in a rechargeable battery powered appliance 3. The appliance 3 may be of any suitable type including tools, flashlights and containers for batteries for use in appliances and the like, and in the illustrated structure is a hand-held electrical appliance having a body 4 with a hollow interior 5. The body 4 of the appliance 3 is fabricated of a suitable non-magnetically conductive material, such as plastic resin and the like, and includes all portions enclosing the battery 2 and an electric load member 6 which may be a motor for tools or a suitable light bulb for flashlights and which is powered during use by the rechargeable battery 2 which is selectively electrically connected to the electric load member 6 by a suitable conductor 7 through a switch 8 in a conventional manner.

The charging device 1 and the respective appliances or battery containers 3 each have elements therein which complete an electro-magnetic induction coupling when properly aligned during movement of the appliances or containers 3 through the charging device 1. The hollow interior 5 of the body 4 may be any desired length and the body 4 has at least one electro-magnetic core 9 embedded therein and positioned at any desired location within the hollow interior 5 between an end thereof and the battery 2. The core 9 is shaped and positioned to be energized while the appliance or container 3 is being moved through the induction charging device 1. The body 4 of the appliance or container 3 may be any desired shape including square, rectangular, octagonal, and the like, however, in the illustrated embodiment of the device 1 and the appliance or container 3 to be recharged therein, the body 4 is generally cylindrical and may be at least partially rotated during movement through the recharging device, as later described.

The electro-magnetic core 9, in the illustrated example, is generally spool-shaped and is preferably of soft iron construction to restrict hysteresis loss. The core 9 has a pair of spaced discs 10 and 11 extending from opposite ends of a center shaft 12. The body 4 of the illustrated appliance 3 is generally cylindrical and the discs 10 and 11 are generally planar and circular and have their respective peripheral edges embedded in the body 4 whereby the core 9 will be in proper position regardless of the orientation of the body 4 and when the appliance or container 3 is rotated within the induction charging device, the peripheral edges of the discs 10 and 11 will be in position to receive a uniform charge, as later described.

An electrically conductive wire coil 13 is contained within the body 4 and surrounds or is looped around the center shaft 12 of the electro-magnetic core 9. The coil 3 is composed of a suitable manner of turns for producing a desired electrical potential across leads 14 and 15 thereof, under the existing magnetic flux conditions and charging load.

One of the leads, for example lead 15, has a suitable rectifier 16 connected thereto for limiting the current in a battery connected lead 17 to a single direction for charging the battery 2. The other lead 14 is connected in series to an opposite pole of the battery 2 from that of the battery connected lead 17 through a resistor 18 for limiting the charging current to a desired amount.

The core 9 may be positioned at any desired location within the hollow interior 5 to properly align with a similar core, as later described, within the charging device 1 to complete an electro-magnetic induction coupling for recharging the battery or batteries 2 whereby the respective appliance or container 3 is coded for recharging in only the charging device 1 of the present invention. There also may be more than one core 9 each having a wire coil 13 with a different number of turns thereby producing various electrical potentials across the respective leads thereof under the existing magnetic flux conditions and charging load. The charging rate for each core 9 and coil 13 is thereby different and the desired charging rate may be selected or designed for the particular appliance or container 3 to be placed in the charging device 1.

When the appliance or battery container 3 has more than one core 9, the leads 14 and 15 of the respective wire coils 13 may be connected in either series or parallel to the respective poles of the battery or batteries 2, as desired, whereby a plurality of charging rates may be provided for the appliance or battery container 3 depending upon the position of the core or cores 9 in the charging device 1, as later described.

The flow of electrical current through the respective coils 13 and the leads 14 and 15 thereof may create heat within the hollow interior 5, therefore, a suitable thermostat 19 is electrically connected to the wire coil 13 and to the battery or batteries 2 to interrupt the respective charging circuit in the event that same overheats. In the illustrated appliance, the thermostat 19 is connected to the leads 14 and 15 and includes suitable switches to break or interrupt the charging circuit.

The body 4 of the appliance 3 has means thereon to cooperatively interengage with means within the induction charging device 1 to selectively position the appliance or battery container 3 in a battery recharging path through the induction charging device 1, as later described. In the illustrated appliance, the body 4 has a plurality of spaced grooves 20 arranged in a selected pattern and having a selected depth within an exterior surface of the body 4 to receive a plurality of spaced protrusions of ribs 21 arranged in a corresponding pattern and extending from certain walls within the induction charging device 1 for defining a passage 22 therethrough. The protrusions or ribs 21 each extend from the walls of the passage 22 a selected distance to be received within a respective groove 20 whereby only an appliance or battery container 3 having a pattern or arrangement and depth of grooves 20 corresponding to the pattern and dimension of the ribs 21 will be properly received and positioned in the proper portion of the passage 22 for charging the batteries 2 therein.

The appliance or battery container 3 is received in the passage 22 of the induction charging device 1 which has a body formed of a suitable non-conductive, non-magnetic plastic resin, or the like. The body of the charging device 1 may be formed in any desired shape, however, said body is illustrated as a generally rectangular structure having top and bottom walls 23 and 24 respectively and front and rear walls 25 and 26 respectively and opposed side or end walls 27 and 28.

Each appliance or battery container 3 may be individually placed in the passage 22 through the induction charging device 1, as by being placed directly through an opening in the top wall 23, however, it is desirable to provide means for placing a plurality of appliances or battery containers 3 in position to be moved through the induction charging device 1, therefore, a storage extension 29 is mounted on the top wall 23 and extends upwardly therefrom. The illustrated storage extension 29 has facing walls having the protrusions or ribs 21 thereon in a pattern corresponding to and aligned with the protrusions or ribs 21 in the passage 22. The extension 29 has an entrance 30 above and aligned with an opening 31 in the top wall 23 whereby appliances or battery containers 3 will move by gravity through the extension 29 and into the passage 22.

In the illustrated embodiment, the front wall 25 terminates above the bottom wall 24 and the bottom wall 24 and side walls 27 and 28 have portions extending forwardly of the front wall 25 to define an appliance exit 32 in the form of tray-like portion adapted to receive and store a plurality of appliances or battery containers 3 therein after the batteries therein have been recharged in the induction charging device 1.

A wall or spaced wall portions 33 are aligned with one of the facing walls of the extension 29 and the wall portions 33 extend from the opening 31 in the top wall 23 to the exit 32 and have the protrusions or ribs 21 extending therefrom whereby each appliance or battery container 3 having corresponding grooves 20 therein will be keyed in position for movement through the passage 22. An appliance support 35 is spaced from the wall or wall portions 33 and cooperates therewith to define the passage 22 and the battery recharging path therethrough.

Each appliance or battery container 3 is guided from the extension 29 through the opening 31 in the top wall and into engagement with the appliance support 35 which is shaped and positioned to receive and support appliances or battery containers 3 and operative to move same along the battery recharging path of the passage 22. The appliance support 35 is illustrated as including a reel 36 having a plurality of hinged sections each connected together to form an endless belt or chain-like member with each hinged section having an arm or lug 37 extending therefrom and shaped to receive and support an appliance or battery container 3 thereby forming and defining spaced appliance or battery container receiving compartments. The reel 36 of the appliance support 35 has one end mounted on a drive shaft 38 and the other end mounted on an idler shaft 39. The drive shaft has suitable power means connected thereto for rotating the appliance support 35 at a rate to move the respective appliance or battery support 3 and battery or batteries 2 therein through the passage 22 to effect a slow or trickle charge in the rechargeable battery 2 of the appliance 3.

In the illustrated structure, the drive shaft 38 having the one end of the appliance support 35 mounted thereon is operatively connected to a suitable motor 40 mounted within the body of the induction charging device 1 and preferably supported on one of the walls enclosing the device, for example front wall 25, and the motor 40 is operative to rotate the appliance support 35 at a rate to effect a slow or trickle charge in the rechargeable battery 2 of the appliance or battery container 3, for example, moving the core 9 of the appliance 3 along a core 41, as later described, adjacent the passage 22 during a period of 1 to 8 hours.

The core 41 is an electro-magnetic member embedded within the induction charging device 1 and the core 41 is shaped and positioned to energize the core 9 as the appliance or battery container 3 is moved through the passage 22, therefore, the core 41 in the illustrated structure, is positioned within the body of the induction charging device 1 and preferably adjacent the wall or wall portions 33 and is generally elongated U-shaped and has a pair of flanges or legs 42 and 43 extending from a web portion 44 with the flanges or legs 42 and 43 terminating within selected wall portions 33 so as to have the discs 10 and 11 aligned with respective flanges 42 and 43 when the appliance or battery container 3 is moved along the battery recharging path. The discs 10 and 11 of the appliance core 9 will thereby be moved in the most advantageous path with respect to the flanges or legs 42 and 43 of the core 41 for an efficient induction coupling although the respective cores remain out of actual physical contact and separated by the non-conductor appliance housing and the wall portions 33.

An electrically conductive wire coil 45 for each core 41 is contained within the body of the induction charging device 1 and loops about or surrounds the web portion 44 of the respective core 41. The coil 45 has leads 46 and 47 extending through and externally of the induction charging device 1 and the leads 46 and 47 are connected to a suitable source of alternating current or oscilating direct current for producing an alternating magnetic field which radiates or extends through the wall portions 33 and primarily into the passage 22 and more particularly that portion of the passage 22 having the appliance core 9 moving therethrough by virtue of the positions of the core flanges or legs 42 and 43. The coil 45 acts as a transformer primary coil and the coil 13 acts as the secondary coil whereby when the appliance or battery container 3 is in charging position, alternating current in the primary coil 45 induces a current in the secondary coil 13 for use in charging the battery or batteries 2 therein.

When the appliance or battery container 3 has more than one core 9, it is necessary for the body of the induction charging device 1 to have a corresponding number of cores 41 therein and each properly positioned to have a respective core 9 aligned therewith as the appliance support 35 moves the respective appliance or battery container 3 through the passage 22. The leads for the wire coils 45 of the cores 41 may also be electrically connected in either series or parallel to correspond to the electrical connection of leads 14 and 15 of the wire coils 13 and thereby cooperating with the respective core or cores 9 to activate or energize same and provide a plurality of charging rates for the battery or batteries 2 in the respective appliance or battery container 3.

The flow of electrical current through the respective wire coils 45 and the leads 46 and 47 thereof creates heat within the body of induction charging device 1, therefore, a suitable fan 48 is positioned therein to direct cooling air toward the core or cores 41 and into the passage 22 and thereby toward the appliance or battery containers 3 therein. Operation of the fan 48 is preferably remotely controlled by a suitable thermostat 48' electrically connected thereto for effecting operation of the fan 48 when the temperature within the induction charging device 1 is above a selected temperature.

The motor 40 may have a suitable timer 49 electrically connected thereto and to a trip switch 50 which is operative to start the motor 40 upon placement of an appliance or battery container 3 in the charging device 1 and maintain the motor 40 in operation for a selected time to move the respective appliance or battery container 3 through the passage 22. The timer 49 is operative to turn off the motor 40 after the respective appliance or battery container 3 moves through the passage 22 and maintain same in an off condition until another appliance or battery container 3 is placed in the charging device 1.

The motor 40 may be operative to move the appliances or battery containers 3 through the passage 22 at a selected speed, as by having a suitable gear reduction unit operatively connected thereto and to the appliance support 35. A suitable circuit connecting the trip switch 50 and the motor 40 includes override or relay means to reset the timer 49 each time an appliance or battery container engages the trip switch 50 while the motor 40 is in operation and maintain the motor 40 in operation until the last appliance or battery container 3 moves through the passage 22.

By way of operation, when an appliance or battery container 3 is positioned within the extension 29 so to have the protrusions or ribs 21 received within the grooves 20, the appliance or battery container 3 will move by gravity through the opening 31 and engage the switch 50 which is operative to complete a circuit to the motor 40 and timer 49 to thereby rotate the appliance support 35 to move the respective appliance or battery container 3 received thereon to establish a magnetic coupling between the cores 9 and 11 which permits the transfer of energy from the alternating current or oscilating direct current source to the coil leads 14 and 15 without any physical contact between electrical conducting surfaces within the induction charging device 1 and the appliance or battery container 3. As previously described, the rectifier 16 permits only unidirectional current to reach the battery or batteries 2 and the resistor 18 limits the current to a desirable amount to prevent battery damage. After the appliance support 35 has moved the appliance or battery container 3 beyond the core 41, the appliance 3 moves by gravity through the passage 22 and into engagement with the exit 32 beyond the front wall 25. To use the recharged appliance or the batteries in the container, it is merely removed from the exit 32 whereupon the next adjacent appliance or battery container 3 moves forward in the exit 32 to a position for easy removal. The motor 40 is operative to stop the appliance support 35 after the last placed appliance or battery container 3 has been moved past the respective core or cores 41. The appliance support 35 has a plurality of spaced compartments or recesses as defined by the arms or lugs 37 of each hinged section of the reel 36 wherein each compartment is sized to receive a respective appliance or battery container 3 whereby a plurality of the appliances and containers may be placed in the charging device 1 at random and sequentially charged within the induction charging device 1, particularly as shown in broken lines in FIG. 3.

Due to the lack of exposed contacting surfaces particularly on the appliance 3 and within the induction charging device 1, these items may be easily hermetically sealed during fabrication for operation under adverse conditions, such as high humidity and high corrosion promoting atmospheres. The lack of physical electrical contact also avoids the possibility of arcing and over-heating at the contact junction, as well as the possibility of failure to make contact altogether and thereby eliminates the need for protective caps on exposed elements.

It is to be understood that selection of the coils, cores, resistor, and rectifier is designed for optimum performance which takes into account the number and spacing between the respective cores in the appliance or battery container and the charging device and characteristics of the battery or batteries. The flanges of the primary core or cores 41 are positioned in a selected spaced relation with the protrusions or ribs 21 and the discs 10 and 11 of the secondary core or cores 9 are positioned in a corresponding spaced relation with the grooves 20 of the appliance or container body 4 whereby only a battery in an appliance or battery container having grooves interengageable with the protrusions or ribs is rechargeable in the induction charging device 1. Appliances or containers with various charging systems may be charged simultaneously and interchangeably in an appropriately constructed charging device.

The size and shape of the appliance or battery container 3 must be coordinated with the size and shape of the entrance 30 and the opening 31 in the top wall 23 and the size and location of the grooves 20 in the body 4 must be coordinated with the size and location of the ribs 21 on the facing walls of the extension 29 whereby only appropriately constructed appliances or battery containers may be received in the induction charging device 1 and have their battery or batteries charged therein.

An additional control measure is the positioning of the core or cores 9 within the appliance or battery container 3 relative to the grooves 20 in the body 4 and the positioning of the core or cores 41 within the induction charging device 1 relative to the ribs 21 within the passage 22 whereby only appliances or battery containers having an appropriately positioned core or cores may have their battery or batteries charged within the induction charging device 1. Flow of alternating current through the wire coil 45 around the core 41 is effective to produce an alternating magnetic field which radiates or extends into the passage 22 and more particularly that portion of the passage 22 having the cores 9 and coils 13 moving therethrough.

An alternating magnetic field may also be effected by an electrical circuit including a suitable direct-current voltage source, such as an alternating-current generator with a rectifier and filter across the output terminals having the output of the direct-current voltage source applied to the leads of the coil 45 through a pulsing switch.

Operation of the pulsing switch may be controlled by a suitable sensor in the appliance or battery container 3 and electrically connected to the terminals of the battery 2 therein whereby the repetition rate of the charging current pulses created by the pulsing switch is controlled by the time in which it takes the terminal voltage of the battery or batteries to reach a predetermined value.

The terminal voltage sensor is operative to send a suitable signal to the pulsing switch without physical contact therewith for controlling the operation of the pulsing switch to charge the battery or batteries by imposing an increasing charge on the battery or batteries 2 by charging during a plurality of charge intervals and by providing battery discharge intervals interspersed with the charge intervals and causing the frequency of the discharge intervals to increase as the charge on the battery or batteries progresses. The duration of intervals of charge may also be diminished as the charge on the battery increases.

An other method of effecting a pulsing direct current includes a suitable cam turned by the motor to interrupt the primary thereby effecting a pulsing current in the respective coil of the appliance or container.

It is to be understood that while I have illustrated and described certain forms of my invention, it is not to be limited to these specific forms or arrangements of parts herein described and shown.

What I claim and desire to secure by Letters Patent is:

1. An induction charging device for recharging a battery in a rechargeable battery powered appliance comprising, a load member, a body having a wall enclosing said load member, a rechargeable battery and a rectifier electrically connected thereto and to a transformer secondary coil and core therein all positioned within said body and enclosed by said wall, said induction charging device comprising:
   a. a housing having walls defining a passage extending therethrough, said passage having an entrance and an exit and defining a battery recharging path through said housing, said passage being shaped to receive a rechargeable battery powered appliance;
   b. cooperating interengaging means on the walls defining said passage and on a body of the appliance to position same in the battery recharging path;
   c. means within said passage for receiving the appliance and moving same along the battery recharging path;
   d. a transformer primary coil and core within said housing and arranged adjacent the battery recharging path so that a secondary coil and core of the appliance will move along the battery recharging path with the cores aligned; and
   e. a source of current connected to the primary coil to thereby energize the secondary coil in the appliance and direct current through a rectifier in the appliance whereby unidirectional current is supplied to the rechargeable battery in the appliance.

2. An induction charging device as set forth in claim 1 wherein said means for receiving the appliance and moving same along the recharging path includes:
   a. a rotatable appliance support;
   b. means operatively connected to said appliance support for rotating said appliance support, said rotating means being operative to rotate said appliance support at a rate to permit said primary coil and core and the secondary coil and core to effect a slow charge in the rechargeable battery of the appliance; and
   c. a plurality of spaced compartments in said appliance support each sized to receive a respective appliance whereby a plurality of said appliances may be sequentially charged within said housing.

3. An induction charging device as set forth in claim 2 including:
   a. walls in said housing defining a second passage through said housing and defining a second battery recharging path through said housing, said second passage having positioning means on the walls defining same for cooperative interengagement with the positioning means on the appliance body to position same in the second battery recharging path in said second passage;
   b. a rotatable appliance support in said second passage; and
   c. means connected to said appliance support in said second passage and operative to rotate same at a rate to permit the secondary coil and core to be energized to effect a quick charge in the rechargeable battery in the appliance.

4. An induction charging device as set forth in claim 1 wherein:
   a. said primary core is generally U-shaped and has a pair of flanges extending from a web portion having the primary coil therearound, said flanges each having an edge positioned adjacent one of the walls defining said passage; and
   b. the secondary core within the appliance is generally spool-shaped and has a pair of spaced discs extending from opposite ends of a center shaft having the secondary coil therearound, said discs being aligned with said respective flanges when the appliance is moved along the battery recharging path.

5. An induction charging device as set forth in claim 4 wherein:
   a. said flanges of the primary core are positioned in a selected spaced relation with said positioning means on said walls defining said passage; and
   b. said discs of the secondary core are positioned in a corresponding spaced relation with said positioning means on the appliance body whereby only a battery in an appliance having positioning means interengageable with said positioning means in said passage is rechargeable in the induction charging device.

6. An induction charging device as set forth in claim 2 including:
   a. walls in said housing defining a second passage through said housing and defining a second battery recharging path through said housing, said second passage having positioning means on the walls defining same for cooperative interengagement with the positioning means on the body of the appliance to position same in the battery recharging path in said second passage;
   b. a rotatable appliance support in said second passage; and
   c. a second transformer primary coil and core adjacent the second battery recharging path through the second passage, said second primary coil being operative to effect a different charge in the battery of the appliance then the charge effected by said first named transformer primary coil.

7. An induction charging device for recharging a battery in a rechargeable battery powered appliance, said induction charging device comprising:
   a. a housing having walls defining a passage extending therethrough, said passage having an entrance and an exit and defining a battery recharging path through said housing, said passage being shaped to receive a rechargeable battery powered appliance;
   b. an appliance support member within said passage;
   c. means operatively connected to said appliance support member for moving same to thereby move the appliance along the battery recharging path;
   d. means on certain of the walls defining said passage and on a body of the appliance to position the appliance in the battery recharging path;
   e. a transformer primary coil and core within said housing and arranged adjacent the battery recharging path so that a transformer secondary coil and core of the appliance will move along the battery recharging path with the cores aligned; and f. a source of current connected to the primary coil to thereby energize the secondary coil in the appliance and direct current through a rectifier in the appliance whereby unidirectional current is supplied to the rechargeable battery in the appliance.

8. An induction charging device as set forth in claim 7 including:
  a. walls within said housing defining a second passage through said housing and defining a second battery recharging path through said housing, said second passage having means on certain of the walls defining said second passage to position the appliance in the second battery recharging path through said second passage;
  b. an appliance support member within said second passage; and
  c. means operatively connected to said appliance support member in said second passage for moving same at a rate to permit the secondary coil and core to be energized to effect a quick charge in the rechargeable battery in the appliance.

9. An induction charging device as set forth in claim 7 including:
  a. walls within said housing defining a second passage through said housing and defining a second battery recharging path through said housing, said second passage having means on certain of the walls defining said second passage to position the appliance in the second battery recharging path through said second passage;
  b. an appliance support member within said second passage;
  c. means operatively connected to said appliance support member in said second passage for moving same to thereby move the appliance along the second battery recharging path in said second passage; and
  d. a second transformer primary coil and core adjacent the second battery recharging path through the second passage, said second primary coil being operative to effect a different charge in the battery of the appliance than the charge effected by said first named transformer primary coil.

10. An induction charging device as set forth in claim 7 wherein said appliance positioning means includes:
  a. a plurality of spaced protrusions extending from the walls defining said passage; and
  b. a like plurality of spaced grooves within a body of the appliance, said grooves being positioned to receive respective protrusions therein whereby only a battery in an appliance having grooves positioned to receive said protrusions is rechargeable in the induction charging device.

11. An induction charging device and a rechargeable battery powered appliance received therein comprising:
  a. a rechargeable battery powered appliance having a load member and a rechargeable battery enclosed within a body;
  b. a transformer secondary coil and core and a rectifier enclosed within said appliance body, the rectifier being electrically connected to said secondary coil and to the rechargeable battery;
  c. a housing having walls defining a passage extending therethrough, said passage having an entrance and an exit and defining a battery recharging path through said housing, said passage being shaped to receive said appliance;
  d. cooperating interengaging means on the walls defining said passage and on said appliance body to position said appliance in said battery recharging path;
  e. means within said passage for receiving said appliance and moving same along the battery recharging path;
  f. a transformer primary coil and core within said housing and arranged adjacent the battery recharging path so that said transformer secondary coil and core within said appliance will move along the battery recharging path with the cores aligned; and
  g. a source of current connected to the primary coil to thereby energize the secondary coil in the appliance and direct current through said rectifier in the appliance whereby unidirectional current is supplied to the rechargeable battery in the appliance.

* * * * *